Oct. 7, 1969
H. C. HORNER
3,470,647
ICE FISHING ALARM SYSTEM
Filed Jan. 18, 1968
3 Sheets-Sheet 1
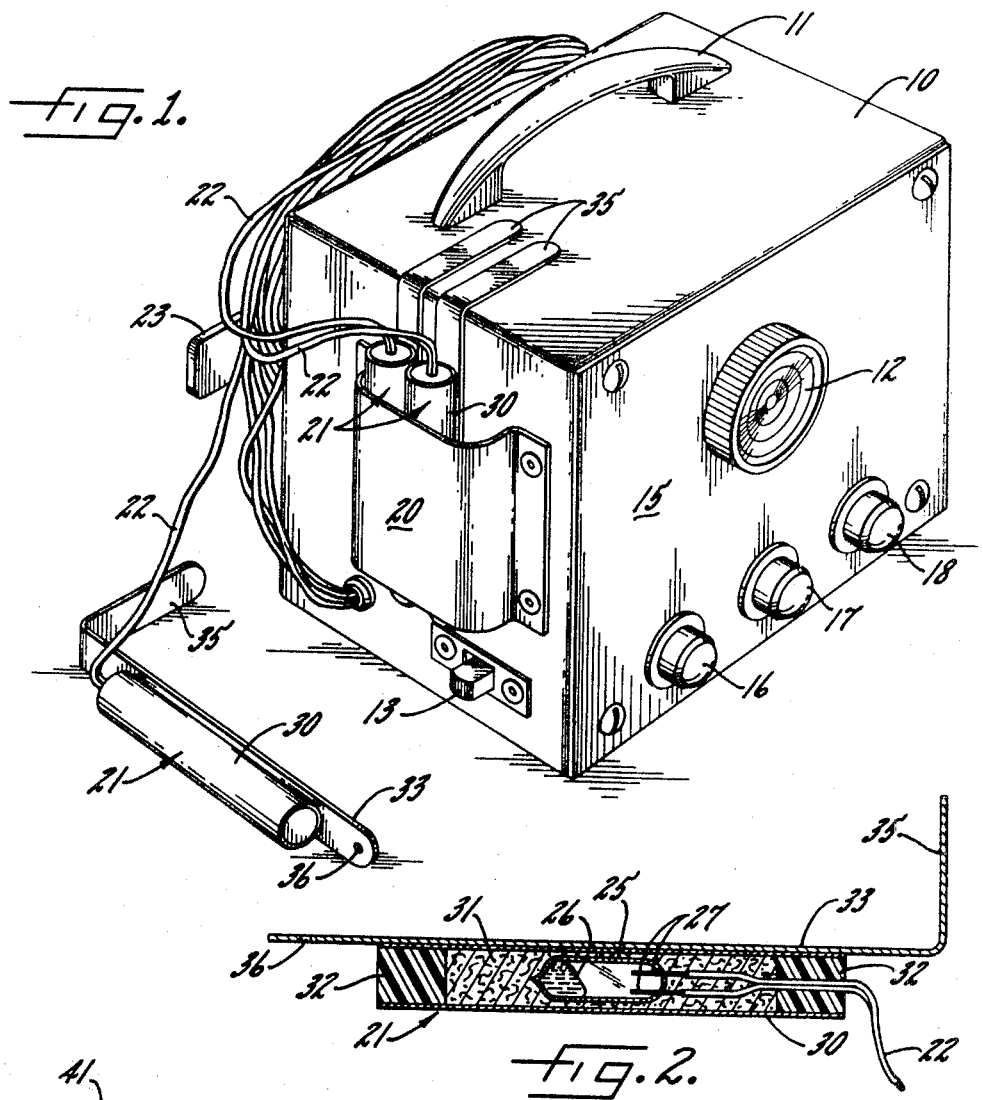
Fig. 1.
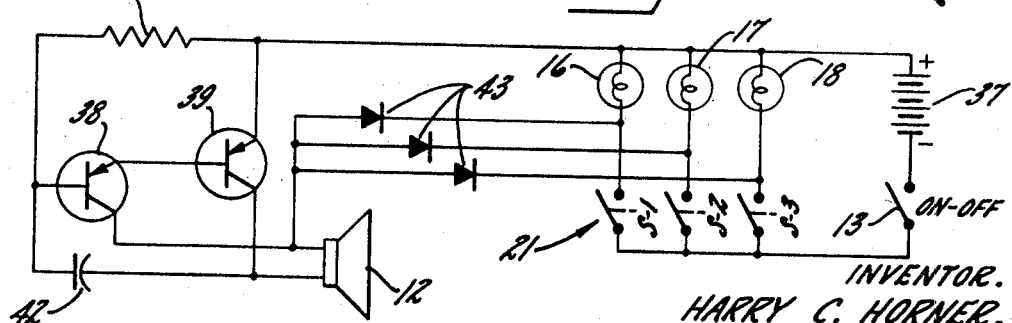
Fig. 2.
Fig. 3.
INVENTOR.
HARRY C. HORNER,
BY
Wolfe, Hubbard, Voit & Osann
ATTORNEYS.

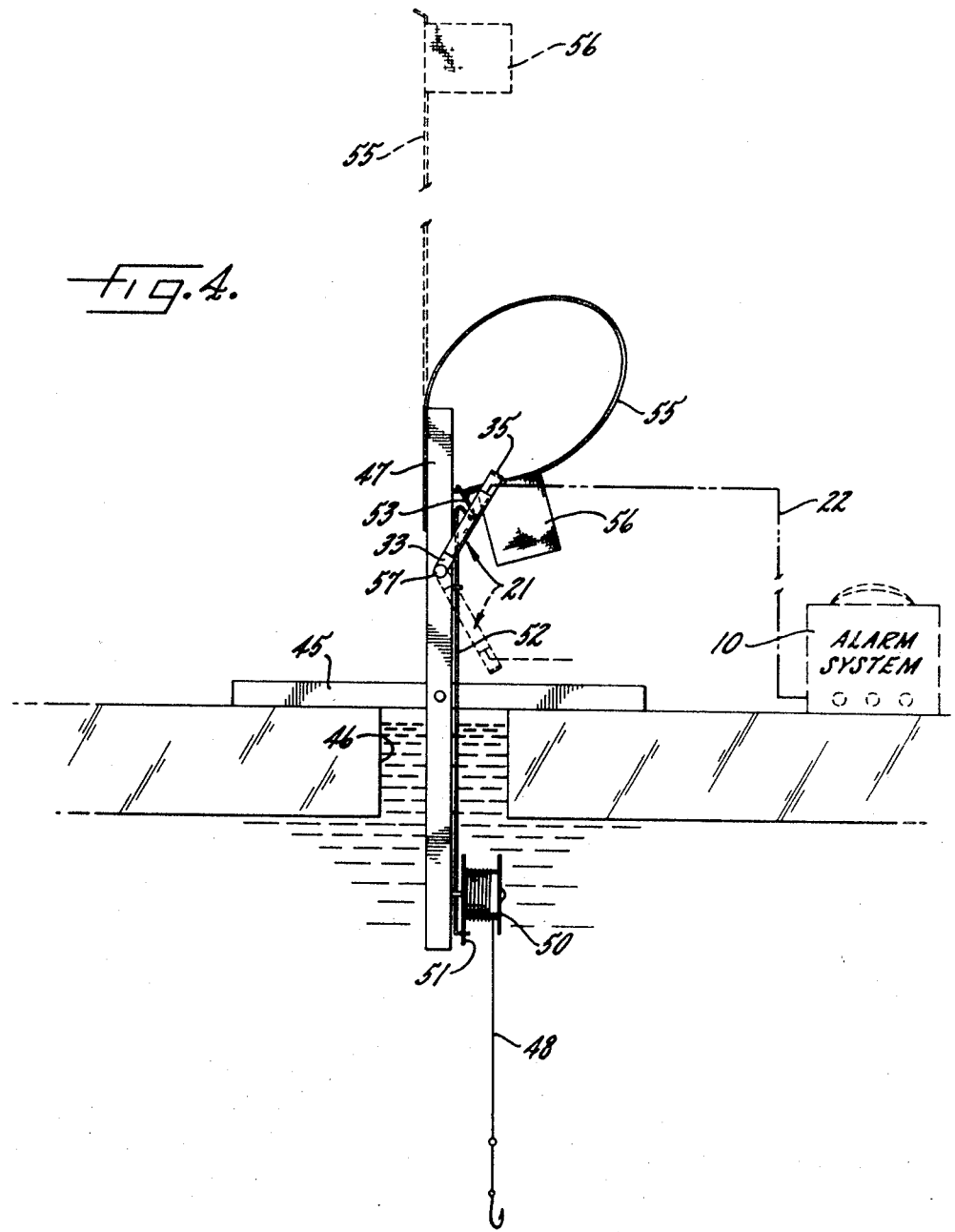

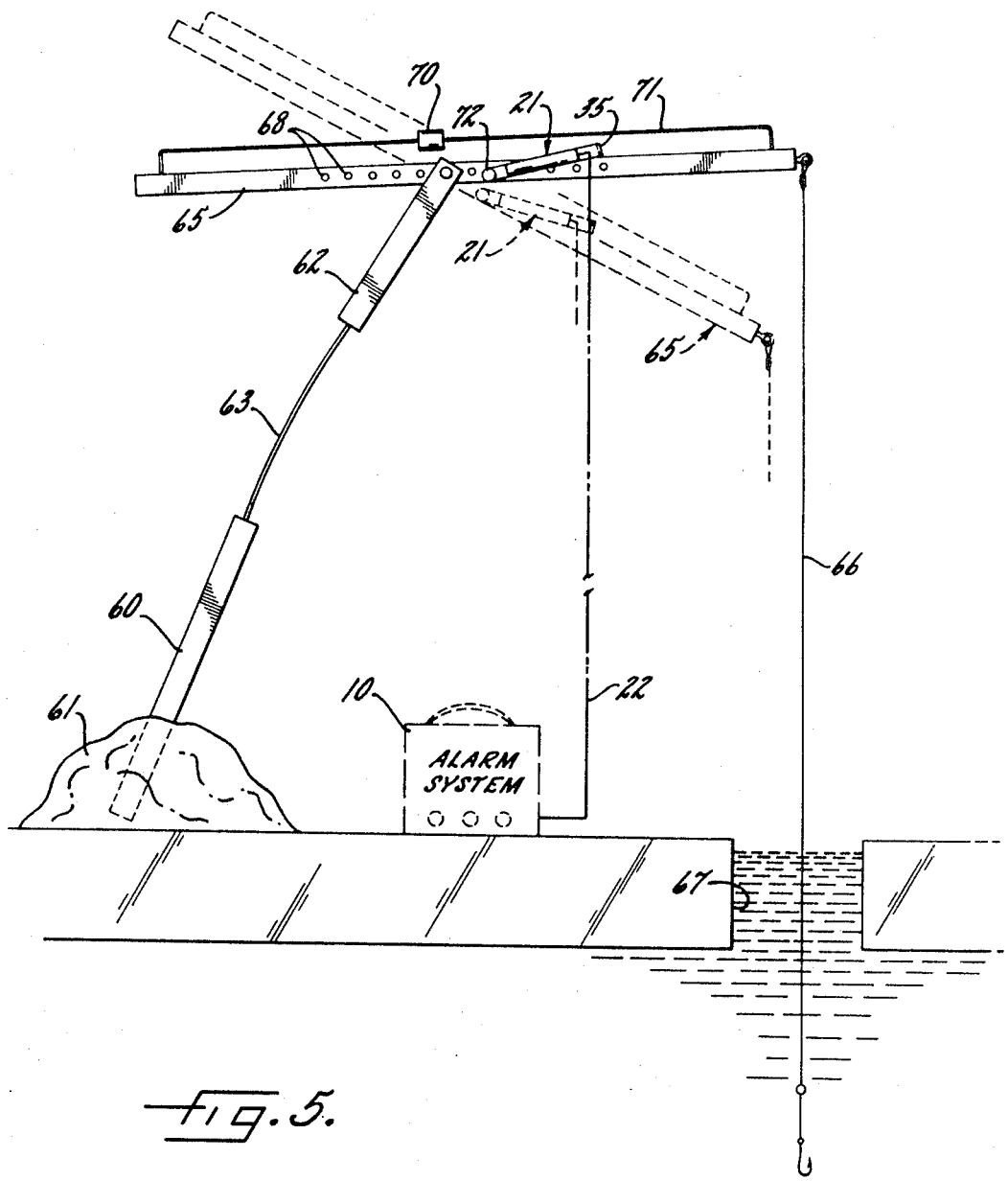

United States Patent Office 3,470,647
Patented Oct. 7, 1969

3,470,647
ICE FISHING ALARM SYSTEM
Harry C. Horner, Mounted Rte. 30,
Fond du Lac, Wis. 54935
Filed Jan. 18, 1968, Ser. No. 698,950
Int. Cl. A01k 97/12
U.S. Cl. 43—17                                        4 Claims

ABSTRACT OF THE DISCLOSURE

An alarm system for ice fishing in which sensing units are employed at a plurality of tip-up stations, and in which signals indicating a disturbance at the tip-up stations are conveyed through a central alarm control center wherein an audible alarm is sounded and a signal light is activated to indicate the particular tip-up station where the activity is located.

---

The present invention relates to alarm signaling devices, and particularly to signaling devices useful in ice fishing. In its principal aspect it encompasses a battery-operated solid-state control center for monitoring a plurality of remotely located tip-up stations.

The perennial popularity of ice fishing has led to a number of schemes designed to allow the fisherman to stay safe and warm in a hut or shanty as he waits for a strike. Most such arrangements use a visible signal which is activated at the hole in the ice where the baited hook is placed. A device which has been long in common usage is the tip-up, which usually comprises a spool of fishing line arranged on a supporting structure resting immediately above a chopped hole in the ice. The fishing line is releasably retained by the mechanism so that when a fish strikes, the mechanism is triggered in a way that causes a flag or other signal to pop upward, catching the fisherman's eye.

These systems are good enough in fair weather, but during hours of darkness and limited visibility due to snow or other causes, the visible tip-up cannot be easily seen. In addition, most shanties are not equipped with sufficient window area so that the fisherman can observe all of his tip-ups at one time without leaving his shelter.

While a few rather complicated electronic devices have also been devised for aiding the fisherman to detect a strike on his baited line, these have suffered from the disadvantages of high complexity, expensive construction, and the disadvantages of inconvenience and unreliability that accompany the use of relatively complex equipment in a rough and hostile environment such as encountered in a sport such as ice fishing.

In view of the foregoing, it is a principal object of the present invention to provide an ice fishing alarm system of improved design in which a plurality of individual tip-up stations may be monitored simultaneously, with provision for an audible warning when a fish strikes any of the stations. Provision for a visual signal to indicate the station at which the activity is located is also contemplated. It is intended that the alarm system be inexpensive, rugged, and capable of operation under adverse conditions of envoriment.

Related to the foregoing is the object of providing an alarm system which is operable with one or more different types of tip-up stations, including the types in which a spring-loaded flag is released when a fish strikes and also in which a balanced beam is pulled over-center when the fishing line is tugged. As part of the system, an encapsulated sensing switch is contemplated which is sensitive to changes in position, and which is small, rugged, and able to withstand considerable abuse without damage. It is further intended that a plurality of such switches be embodied in the control apparatus in a manner which allows it to be assembled to a compact unit for ease of storage and carrying, yet which permits quick access to the sensing switch units whereby they may be easily carried to the tip-up units with which they are to be associated.

Other objects and advantages of the invention will become apparent upon reading the following specification and upon reference to the drawings, in which:

FIGURE 1 is a perspective of an ice fishing alarm system exemplifying the present invention, with one of the sensing switches shown removed from its storage holder;

FIG. 2 is an enlarged longitudinal section of one of the sensing switches as used in the present invention;

FIG. 3 is a schematic circuit diagram of the apparatus of FIG. 1;

FIG. 4 is a first embodiment of a tip-up assembly as utilized with the signal switch and control center of the present invention; and FIG. 5 is a second alternative embodiment of a tip-up means.

While the invention will be described in connection with a particular exemplary embodiment, it will be understood that it is not intended to so limit the invention, but it is instead intended to cover all alternative and equivalent constructions as may be included within the spirit and scope of the invention.

Turning now to the drawings, there is shown in FIGURE 1 an alarm control center constructed according to the present invention. It has a cabinet 10 in which the internal power supply and operating circuits are housed, and a carrying handle 11 is provided for easy handling. An audible sound source 12, in this case a loudspeaker, is located on one side of the cabinet 10 and on an adjacent side is an off-on switch 13.

The cabinet 10 has a face panel 15 on which warning lights 16, 17, 18 are located. Each of the lights corresponds to an individual fishing tip-up station, and so the lights 16, 17, 18 are preferably provided with colored lenses to distinguish one from another.

On one side of the cabinet 10 is provided a bracket 20 having an opening at one end into which individual sensing switch units 21 may be inserted. Each sensing switch 21 is electrically connected to the circuitry housed within the cabinet 10 by connecting wires 22. At the rear of the cabinet 10, opposite the face 15, is provided a winding frame or bracket 23 on which the wires 22 may be coiled for storage.

As a feature of the invention, each of the sensing switches 21 is constructed in a manner which renders the operating elements of the switch insensitive to shock, immersion, and other abuses. The principal operating element of each switch 21 is a small glass ampule 25 containing a quantity of liquid mercury 26. A pair of electrodes 27 is located at one end of the ampule 25 and sealed by fusion with the glass material, and then electrically connected to the connecting wires 22. The resulting assembly including the ampule 25, mercury 26, and electrodes 27, is commonly referred to as a "mercury switch" and is commercially available in several forms. Pursuant to the invention, however, this assembly is encapsulated within a tubular housing or barrel 30 constructed of metal or a suitable sturdy plastic and cushioned therein with encapsulating or packing material 31 which completely fills the inside of the tube 30. The encapsulation material 31 may be hardenable plastic, a synthetic rubber, or any other suitable shock-resistant or resilient material. In the illustrative example, the tube 31 is sealed at each end with plugs 32 which may be of a different hardenable plastic material such as epoxy resin, or may alternatively be of the same hardenable material as the internal encapsulation material 31. Secured to the exterior of the tube 30 is an L-shaped mounting bracket 33 having a bent operating tab or tongue 35 at one end and a mounting hole 36 in an extended tongue or tab at the other end.

In operation, tilting of the sensing switch 21 causes the mercury 26 to roll to one end or another of the glass ampule 25. Upon encountering the electrodes 27, the mercury completes an electrical circuit between them and triggers an alarm in the control center as will be described further herein.

As a more detailed feature of the invention, the sensing switches 21 are adapted to slip within the mounting bracket 20 on the cabinet 10 in a way which renders them safe and easy to carry from place to place. The L-shaped bracket 33 with its bent tongue 35 rests against the surface of the cabinet 10 in the manner shown in FIG. 1, with the cylindrical barrels 30 of the individual switches 21 being retained by the bracket 20. The wire 22 is then wound or looped around the winding frame 23 to complete the preparation of the unit for carrying or for storage.

The circuit of the exemplary embodiment of the present invention is shown in FIG. 3. A power source 37, preferably an ordinary dry cell battery, is connected in series with the one-off switch 13. An audible signal means or transducer is provided which includes the loudspeaker 12 and an oscillator circuit consisting of transistors 38, 39, resistor 41, and capacitor 42. These circuit elements in combination generate an electrical oscillation at an audible frequency which appears at the loudspeaker 12 as an audible tone. Diodes 43 serve to keep the lamp circuits isolated.

In the exemplary embodiment provision is made for three individual sensing switches 21 at separate tip-up stations which are identified as S-1, S-2, and S-3 in FIG. 3. Each of the individual sensing switches 21 is connected in series with one of the indicating lights 16, 17, 18. In operation, when any of the individual sensing switches 21 is tipped so that the mercury 26 flows into contact with the electrodes 27, that portion of the circuit is energized causing one of the respective indicating lamps 16, 17, 18 to be illuminated and causing an audible tone signal to issue from the loudspeaker 12.

As a feature of the invention, the sensing switch unit 21 is adaptable for use with a variety of tip-up means. As shown in FIG. 4, one commonly used tip-up means consists of a base member 45 located horizontally across a hole 46 cut in the ice. Attached to the base 45 is an upright 47 which carries at one end a fishing line 48. In this embodiment, the fishing line 48 is spooled on a reel 50 having a projection 51 which rotates with the reel 50. Carried by the upright 47 is a trigger member 52 which in this embodiment consists of a wire shaft pivoted for rotation about its axis. In operation, the action of a fish in striking the line 48 causes the reel 50 to rotate, and the projection 51 engages and actuates the trigger member 52. At its opposite end, the trigger member 52 has its own projection 53 which acts as a catch means and engages the free end of a resilient wire loop 55. When freely extended the wire loop 55 extends upright, but when bent over, it may be hooked against the projection 53 of the trigger member 52 and held therein until the trigger member is released when a fish strikes. A signal flag 56 is commonly carried by the wire loop 55 which is visible to the fisherman when the mechanism has been released.

In keeping with the invention, the sensing switch 21 is carried by the upright 47 with a pivot 57 inserted through the hole 36 at one end of the L-shaped bracket 33. In the illustrative embodiment of FIG. 4, the pivot 57 preferably consists of a nail or tack. This allows the sensing switch 21 to rotate about the mounting hole 36 so that it may be freely tipped to activate the mercury switch inside. The operating tab or tongue of the L-shaped bracket 33 in this case engages the free end of the wire loop 55 at the opposite end from the pivot 57 when in the hooked position against the trigger member 52. In this way it may be seen that release of the trigger member 52 triggers in turn both release of the wire loop 55 and flag 56 as well as the release of electrical sensing switch 21. The latter is then connected by wires 22 to the central control system as previously described.

In FIG. 5 there is shown a further embodiment of the present invention. A base member 60 is thrust into a suitable mound of snow or ice 61 for support and carries an upright 62 at the end of a resilient connecting member 63. The purpose of this member 63 is to allow the mechanism carried by the upright 62 to bob up and down in the wind, thereby imparting a desirable action to the fishing bait.

Pivoted to the upright 62 is a crossmember 65, which in this embodiment consists of a balanced beam pivoted at one of a plurality of pivot holes 68 and which is balanced over-center so as to serve as a trigger member. At one end of the balanced beam 65 is carried a fishing line 66 which extends through a hole in the ice 67 as with the embodiment of FIG. 4. The balanced beam 65 is provided with a plurality of pivot holes 68 so that balance may be achieved whereby the beam 65 remains horizontal. In addition, a sliding adjusting weight 70 is provided which is frictionally retained on a guide wire 71. The purpose of the weight 70 is to place the center of gravity of the balanced beam 65 over-center, so that a slight tip will cause the beam 65 to become unbalanced and overcome the natural friction of its pivot on the upright 62. It will then drop to a substantially non-horizontal position.

In carrying out the invention in this embodiment the sensing switch 21 is rigidly attached to the balanced beam 65 in a manner such that when the beam 65 is tipped over-center, the sensing switch 21 is tipped in a like manner, thus making contact between the electrodes 27 within the mercury switch. To this end, the L-shaped bracket 33 is secured adjacent the beam 65 with a fastener 72 placed through the mounting hole 36. The tongue 35 then rests on top of the beam 65. As before, the connecting wire 22 completes the electrical circuit to the alarm control center.

What is claimed is:

1. An audible and visible ice fishing alarm system comprising in combination:

tip-up means including a base, an upright carried by said base, a fishing line supported by said upright, and a trigger member movably carried by said upright and engageable with said fishing line;

a sensing switch carried by said tip-up means and engaging said trigger member, said sensing switch comprising a hollow ampule containing a quantity of liquid mercury encapsulated therein and having two electrical contacts in one end whereby the movement of said mercury into engagement with said contacts effects electrical connection between said contacts, said ampule being fixed to an operating tab at its end carrying said contacts and having a pivot at the other end, said switch being secured to said tip-up means by said pivot in a normal position in which said mercury is retained by gravity at the end of said barrel opposite said contacts and being movable by said trigger member into a tripped position in which said ampule is tipped whereby electrical contact is made between said contacts;

an alarm control station located remote from said tip-up means and switch and electrically connected thereto, said station comprising a cabinet, a source of electrical energy, audible signal means including an electrical oscillator and an audio transducer, visible signal means including an electric lamp, and circuit means interconnecting said sensing switch and control station whereby said signal means are energized upon the disturbance of said fishing line at said tip-up;

and having a winding bobbin secured to said cabinet for winding said connecting wires, a carrying handle, and a storage compartment integral with said cabinet for carrying said sensing switch means.

2. An audible and visible ice fishing alarm system comprising, in combination:

tip-up means including a base, an upright carried by said base, a fishing line supported by said upright, and a trigger member movably carried by said upright and engageable with said fishing line;

a sensing switch carried by said tip-up means and engaging said trigger member, said sensing switch comprising a hollow ampule containing a quantity of liquid mercury encapsulated therein and having two electrical contacts in one end whereby the movement of said mercury into engagement with said contacts effects electrical connection between said contacts, said ampule being fixed to an operating tab at its end carrying said contacts and having a pivot at the other end, said switch being secured to said tip-up means by said pivot in a normal position in which said mercury is retained by gravity at the end of said barrel opposite said contacts and being movable by said trigger member into a tripped position in which said ampule is tipped whereby electrical contact is made between said contacts;

an alarm control station located remote from said tip-up means and switch and electrically connected thereto, said station comprising a cabinet, a source of electrical energy, audible signal means including an electrical oscillator and an audio transducer, visible signal means including an electric lamp, and circuit means interconnecting said sensing switch and control station whereby said signal means are energized upon the disturbance of said fishing line at said tip-up; and having an open-ended mounting bracket sized to accommodate the barrels of a plurality of individual sensing switches, said bracket being spaced from an edge of said cabinet whereby the operating tabs of said switches are retained by contact with the cabinet.

3. Apparatus as defined in claim 2 in which said circuit means interconnecting said sensing switch and control station comprises a length of wire, and in which said cabinet further includes a winding frame for securing said wire in a coiled condition.

4. Apparatus as defined in claim 2 in which said sensing switch ampule is formed of glass and said electrical contacts are spaced from each other, a cylindrical barrel enclosing said ampule and spaced therefrom, resilient packing material surrounding said ampule and filling the spaces therebetween, said barrel being plugged at each end by hardenable plastic encapsulation material, and said barrel having at one end an extended tongue having a pivot hole and at the other end an L-shaped tongue engageable with said trigger member.

References Cited

UNITED STATES PATENTS

| | | | |
|---|---|---|---|
| 2,170,000 | 8/1939 | Eggleston | 43—17 |
| 2,205,352 | 6/1940 | Fisher | 43—17 |
| 2,464,309 | 3/1949 | Harshman | 43—17 |
| 2,556,628 | 6/1951 | Nisle | 43—17 |
| 2,679,036 | 5/1954 | Vasek | 43—17 X |
| 2,799,962 | 7/1957 | Mogren | 43—17 |
| 3,187,456 | 6/1965 | Apitz | 43—17 |

SAMUEL KOREN, Primary Examiner

DANIEL J. LEACH, Assistant Examiner